United States Patent [19]

Powers

[11] Patent Number: 4,588,206
[45] Date of Patent: May 13, 1986

[54] VEHICLE STABILIZER

[76] Inventor: Connie A. Powers, 7710 Maple Ave., Takoma Park, Md. 20912

[21] Appl. No.: 622,630

[22] Filed: Jun. 20, 1984

[51] Int. Cl.⁴ .............................................. B60R 27/00
[52] U.S. Cl. ................................................... 280/758
[58] Field of Search ............... 293/692; 280/758, 757, 280/759

[56] References Cited

U.S. PATENT DOCUMENTS

| | | | |
|---|---|---|---|
| 1,954,409 | 4/1934 | Hanel | 280/758 |
| 2,155,130 | 4/1939 | Hanel | 280/758 |
| 2,797,931 | 7/1957 | Hans | 280/758 |
| 3,501,167 | 3/1970 | Palowsky | 280/758 |
| 3,655,216 | 4/1972 | Watts | 280/758 |

FOREIGN PATENT DOCUMENTS

| | | | |
|---|---|---|---|
| 601413 | 7/1932 | Fed. Rep. of Germany | 280/758 |
| 1022269 | 12/1952 | France | 280/758 |

*Primary Examiner*—Richard A. Bertsch
*Attorney, Agent, or Firm*—Donald A. Kettlestrings

[57] ABSTRACT

An improved vehicle stabilizing apparatus for mounting on a rear portion of a vehicle for reducing vehicle skidding and for dampening vehicle vibration. An inverted V-shaped hollow tubular housing having closed ends and defining an interior chamber is transversely mounted on the vehicle. Weights are located and are movable within the chamber, and resilient means within the chamber transfer forces from the weights to the vehicle to resist lateral movement of the vehicle and to maintain the rear wheels of the vehicle in contact with the road surface.

6 Claims, 8 Drawing Figures

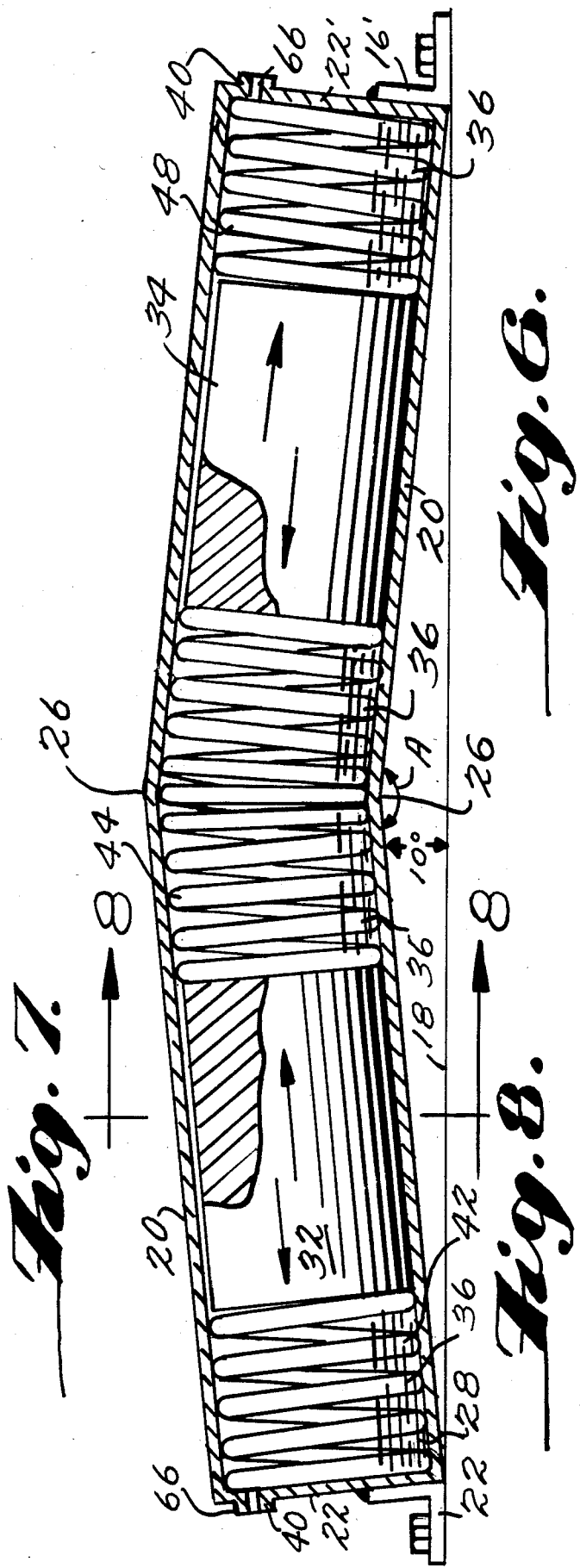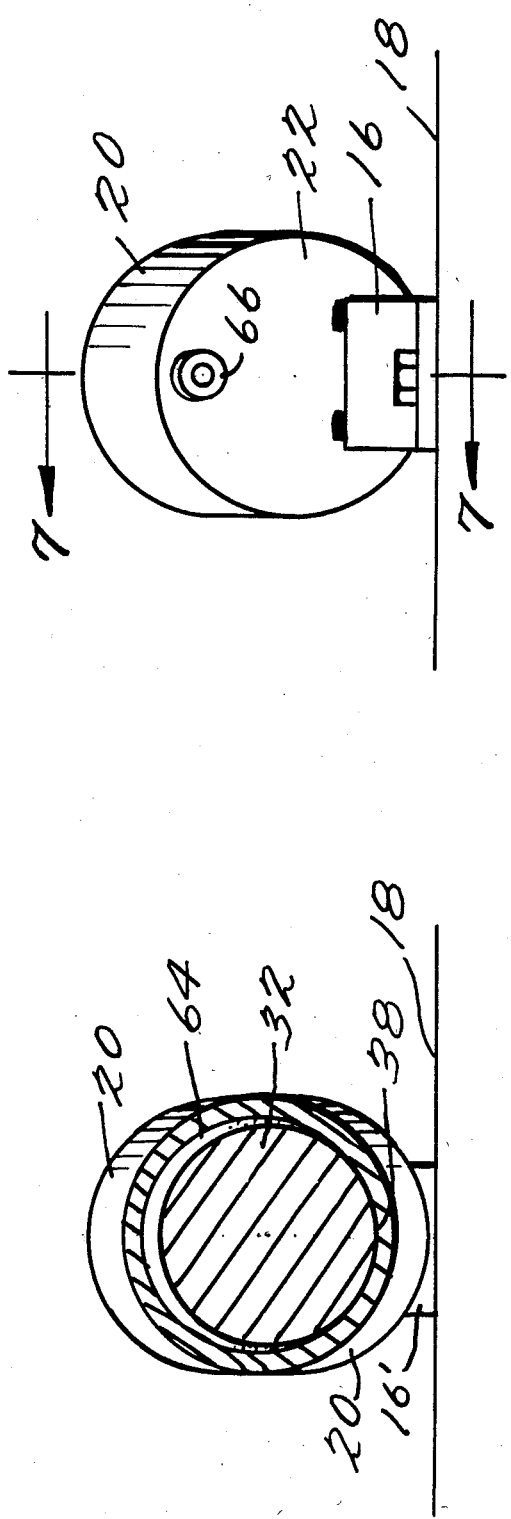

VEHICLE STABILIZER

This invention relates to a vehicle stabilizer and more particularly to vehicle stabilizing apparatus for reducing vehicle skidding and for dampening vehicle vibrations.

Numerous vehicle stabilization systems have been devised for reducing vehicle skidding and for dampening vehicle vibrations. Many stabilizers have been designed to counteract the centrifugal forces acting on a vehicle when the vehicle is turning. The centrifugal forces created by the turning of vehicles may often be of such a magnitude that the forces overcome the frictional resistance between the vehicle tires and the road surface. This results in dangerous skidding of the vehicle, and previously known vehicle stabilizers have been designed to reduce or counteract such skidding.

Examples of existing vehicle stabilizers are described in U.S. Pat. Nos. 2,155,130; 2,797,931; 3,596,924 and 3,655,216. Although these prior art stabilizers have served the purpose, they have not proved entirely satisfactory under all conditions of service. Each of the prior art stabilizers has used a straight horizontal tube for containing the weight or weights and this has not allowed the weight or weights to react as effectively to counteract the centrifugal forces on the vehicle as does the inverted V-shaped configuration of the stabilizer described herein.

It is, therefore, an object of the present invention to provide a vehicle stabilizer having an inverted V-shaped hollow tubular housing for containing weights to counteract centrifugal forces on the vehicle.

Another object is to provide a vehicle stabilizer for preventing vehicle skidding and for dampening vehicle vibrations.

A further object of the invention is the provision of a vehicle stabilizer which acts to maintain the rear wheels of the vehicle in contact with the road surface.

Still another object is to provide a vehicle stabilizer which acts to reduce vehicle sway and bounce.

Yet another object of the present invention is the provision of a vehicle stabilizer which acts to give the driver of the vehicle more control during sharp turns.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a vehicle stabilizer for mounting on a rear portion of a vehicle, the stabilizer comprising an inverted V-shaped hollow tubular member adapted to be secured to the vehicle and transversly to the longitudinal axis of the vehicle, end members covering the ends of the tubular member and cooperating with the tubular member to form a chamber within the tubular member, first and second weights located within the chamber to be normally positioned symmetrically with respect to the longitudinal axis of the vehicle, and resilient means within the chamber and in operative relationship with the weights for yieldingly urging the weights away from the end members and the center of the chamber.

Preferably, the tubular member is substantially circular in cross section and the weights are also substantially circular in cross section, with the cross sectional dimensions of the weights being less than the corresponding cross section dimensions of the tubular member, whereby the area of frictional contact between the weights and the tubular member is minimized.

In accordance with the invention, means are provided in operative relationship with the tubular member for enabling the introduction of lubricant into the chamber and between the weights and the tubular member.

It is to be understood that both the foregoing general description and the following detailed description are exemplary and explanatory, but are not restrictive of the invention.

The accompanying drawings, which are incorporated in and constitute a part of this specification, illustrate an example of a preferred embodiment of the invention and, together with the description, serve to explain the principles of the invention.

FIG. 6 is an end elevational view of the stabilizer;

FIG. 7 is a cross sectional view of the stabilizer taken along the line 7—7 in FIG. 6 and looking in the direction of the arrows; and FIG. 8 is a cross sectional view of the stabilizer taken along the line 8—8 in FIG. 7 and looking in the direction of the arrows.

Figure 1:
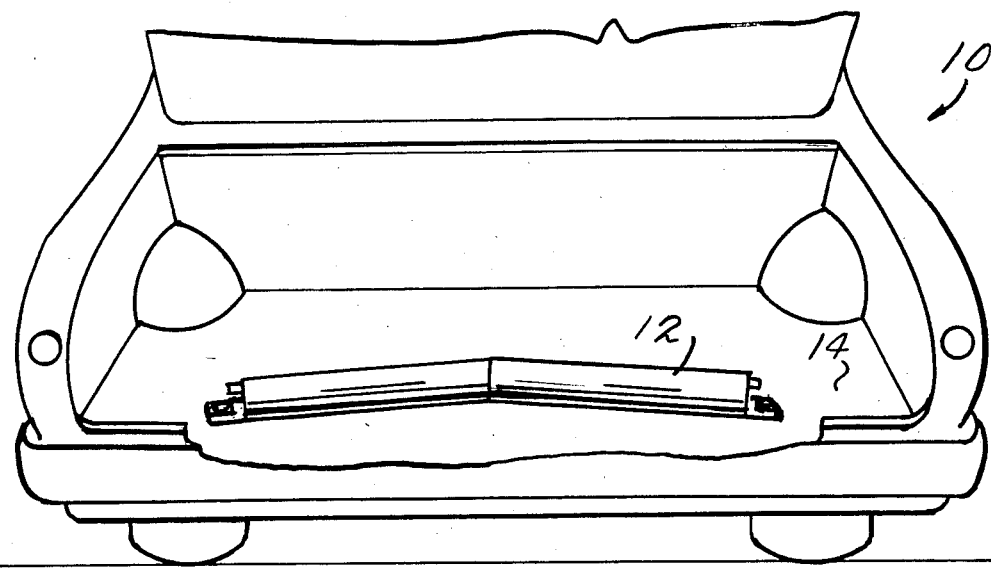
FIG. 1 is a fragmentary perspective view of the stabilizer installed within the rearward trunk compartment of an automobile.

With reference now to the drawings, wherein like reference characters designate like or corresponding parts throughout the several views, there is shown a vehicle 10, such as an automobile. Vehicle stabilizer 12 is mounted on a rear portion of the vehicle, and preferably rearwardly of the rear axle of the vehicle to be most effective. Stabilizer 12 may be mounted within a rearward trunk compartment 14 by bracket members 16 which are attached to floor 18 of the trunk compartment.

Stabilizer 12 includes an inverted V-shaped hollow tubular member or housing 20 positioned transversly to the imaginary longitudinal axis of vehicle 10. End members 22, 22' cover the ends of tubular housing 20 and are attached to bracket members 16, 16'. End members 22, 22' cooperate with tubular member 20 to form a chamber 28 within the tubular member.

A first weight 32 is located within chamber 28, and a second weight 34 is located within chamber 28. Weights 32 and 34 are normally positioned symmetrically with respect to the longitudinal axis of the vehicle, and resilient means 36 are located within chamber 28 and in operative relationship with weights 32, 34 for yieldingly urging the weights away from end members 22 and away from the center of the chamber.

Tubular housing 20 is preferably substantially circular in cross section and weights 32, 34 are also preferably substantially circular in cross section. In order to minimize the area of frictional contact between weights 32, 34 and tubular member 20 so that freedom of movement of the weights within the tubular member is maximized, the cross-sectional dimensions of weights 32, 34 are significantly less than the corresponding cross-sectional dimensions of tubular member 20. This is best illustrated in FIG. 8 wherein the narrow area of contact between the weights and tubular member 20 is shown at 38.

In order to further enhance freedom of movement of weight 32, 34 transversly to the longitudinal axis of the vehicle and within tubular member 20, and in order to reduce the frictional forces between the weights and the tubular member, means 40 are preferably provided in operative relationship with tubular member 20 for enabling introduction of lubricant 64 into chambers 28, 30. The lubricant forms a film between weights 32, 34 and tubular member 20 and enables greater ease of movement of the weights.

Resilient means 36 preferably include a first helical spring 42 positioned between end member 22 and weight 32, and a second helical spring 44 is located between weights 32 and 34. A third helical spring 48 is positioned between weight 34 and end member 22'.

The size and weight of stabilizer 12 and of weights 32, 34 may vary in accordance with the size, weight and handling characteristics of vehicle 10. For example, a larger vehicle may require a larger stabilizer and heavier weights. The degree of bend or the angle at apex 26 of inverted V-shaped tubular member 20 may also vary in accordance with the size, weight and handling characteristics of the vehicle. Experiments have determined however, that an interior angle A at apex 26 of housing 20 of approximately 160° provides the desired stabilizing characteristics for most conventional sized automobiles. Of course, angle A could be increased or decreased in accordance with the specific requirements of the vehicle on which the stabilizer is mounted. In fact, tubular member 20 could be made to enable adjustment of angle A after stabilizer 12 is installed within the vehicle. This would allow the stabilizer to be adjusted to provide for optimum stabilizing results with a specific vehicle.

Figure 2:
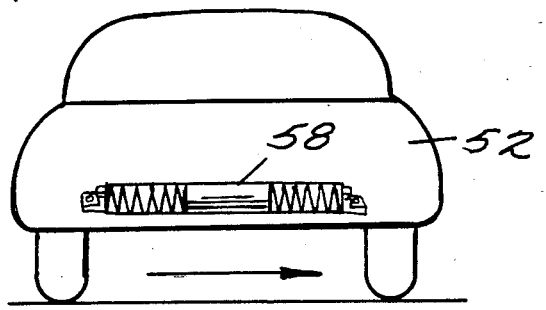
FIG. 2 is a diagrammatic perspective rear view of a prior art device installed within the trunk compartment of an automobile.
Figure 3:
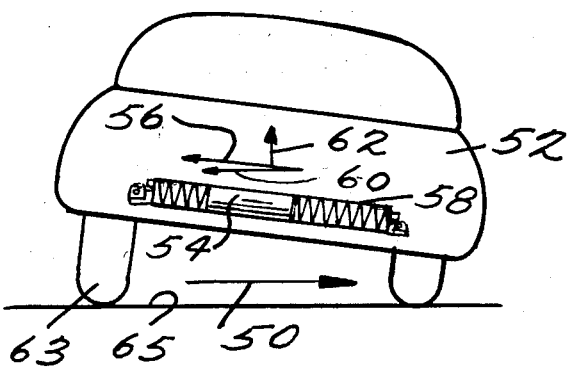
FIG. 3 is a diagrammatic perspective rear view of the device shown in FIG. 2 and illustrating operation of the prior art device as the automobile turns to the left.

Operation of prior art vehicle stabilizers and the advantages of the stabilizer described herein will be best understood by reference to FIGS. 2-5. FIGS. 2 and 3 illustrate prior art stabilizers using horizontal and straight tubular casings for containing weights. In operation of the prior art devices, centrifugal forces act on the vehicle in the direction of arrow 50, for example, as the vehicle is sharply turned to the left. As a result, the suspension system of the vehicle will allow the vehicle body to tip in the manner shown by FIG. 3. Because of its inertia, weight 54 of the prior art stabilizer tends to move in the direction of arrow 56. However, because of the tilting of vehicle body 52 and because straight tubular container 58 of the prior art device is also tilted, the reactive force 56 created by movement of weight 54 will have one force component 60 in a horizontal direction and another force component 62 directed upwardly.

As vehicle body 52 tilts, the "inside" rear wheel 63 will tend to be lifted from the road surface and frictional forces between rear wheel 63 and road surface 65 will be decreased. This will contribute to the tendency of the vehicle to move in a lateral direction and to skid. The reactive force component 62 of weight 54, however, will be located to the left of the longitudinal axis of the vehicle and will further tend to raise wheel 63 from the road surface.

In the operation of this invention, oil or other lubricant 64 is provided in predetermined amounts through ports 66 of stabilizer 12. Although the ports are shown in association with end members 22, 22', it should be understood that the ports may be provided at any convenient location within stabilizer 12 so as to provide optimum lubrication between weights 32, 34 and housing 20.

Figure 4:
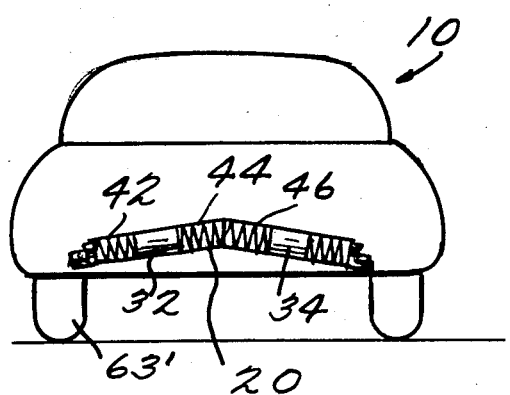
FIG. 4 is a diagrammatic perspective rear view of the stabilizer of this invention installed within the trunk compartment of an automobile.
Figure 5:
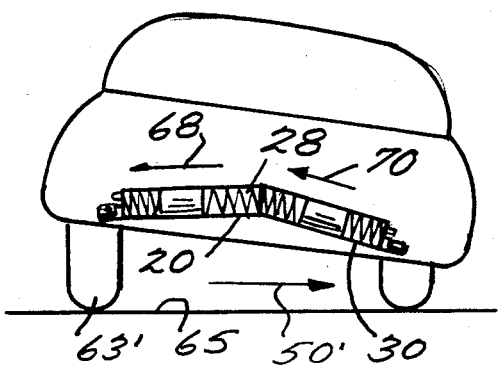
FIG. 5 is a diagrammatic perspective rear view of the stabilizer of this invention and illustrating operation of the stabilizer as the automobile turns to the left.

With reference now to FIGS. 4 and 5, weights 32, 34 are normally maintained within chamber 28 and in symmetrical relationship with respect to the longitudinal axis (not shown) of vehicle 10. Helical springs 42, 44 and 48 maintain the weights in this normal symmetrical arrangement. If vehicle 10 is turned to the left, for example, while moving in a forward direction, a centrifugal force acts on the vehicle in the direction of arrow 50'. The vehicle's suspension system enables vehicle body 52 to be tilted in an "outward" direction as the vehicle moves through the turn, and this is best illustrated in FIG. 5. This tilting of the vehicle body combined with centrifugal force 50' tends to lift "inside" rear wheel 63' from road surface 65 but stabilizer 12 effectively counteracts this tendency.

As vehicle body 52 tilts in the "outward" direction illustrated in FIG. 5, stabilizer 12 and its tubular housing 20 will also be tilted. Weights 32, 34 will, due to their inertia, move in the direction of arrows 68,70, respectively. Because of the inverted V-shape of housing 20, however, first chamber 28 will still be oriented such that the components of reactive force 68 will act in a horizontal direction and in a downard direction. Thus, the reactive forces created by weight 32 will oppose centrifugal force 50' and will also act downwardly to keep rear wheel 63' in contact with the road surface.

During the tilting movement of the vehicle illustrated in FIG. 5, the side of chamber 28 with weight 34 will be oriented so that the components of reactive force 70 from weight 34 will act in a horizontal direction to oppose centrifugal force 50' and in an upward direction. The upwardly directed reactive force component of weight 34 will be positioned to the right of the longitudinal axis of the vehicle and the moment arm about that axis created by the upwardly directed force component of reactive force 70 will act to prevent tilting of vehicle body 53' and will tend to further stabilize the vehicle.

Because of the inverted V-shape of housing 20, weight 32 does not have to move against the forces of gravity in any upward direction as it reacts against centrifugal force 50'. As a result, weight 32 more readily moves toward end member 22 and further away from the longitudinal axis of the vehicle. The ability of weight 32 to move closer to end member 22 results in a greater force moment in a downward direction about the vehicle's longitudinal axis and this downwardly directed force moment acts to maintain rear wheel 63' in contact with the road surface. The inverted V-shape configuration of housing 20 enables gravity to enhance the effectiveness of the stabilizer.

This invention provides for an improved vehicle stabilizer which is more effective in counteracting vehicle skidding movements and which is more effective in dampening vehicle vibrations. The stabilizer of this invention also acts to keep the wheels of the vehicle in contact with the road surface and reduces vehicle sway, vibration and bounce. Because of the smoother movement of the vehicle, increased gasoline mileage may also result.

The invention in its broader aspects is not limited to the specific details shown and described, and departures may be made from such details without departing from the principles of the invention and without sacrificing its chief advantages.

What is claimed is:

1. A vehicle stabilizer for mounting on a rear portion of a vehicle, said stabilizer comprising:
    an inverted V-shaped hollow tubular member adapted to be secured to said vehicle and transversly to the longitudinal axis of the vehicle;
    end members covering the ends of said tubular member and cooperating with said tubular member to form a chamber within said tubular member;
    first and second weights located within said chamber to be normally positioned symmetrically with respect to the longitudinal axis of the vehicle; and
    resilient means within said chamber and in operative relationship with said weights for yieldingly urging said weights away from said end members and the center of said tubular member.

2. A vehicle stabilizer as in claim 1 wherein said tubular member is substantially circular in cross section and wherein said weights are substantially circular in cross section, the cross-sectional dimensions of said weights being less than the corresponding cross-sectional dimensions of said tubular member, whereby the area of frictional contact between said weights and said tublar member is minimized.

3. A vehicle stabilizer as in claim 2 further including means in operative relationship with said tubular member for enabling introduction of lubricant into said chambers and between said weights and said tubular member.

4. A vehicle stabilizer as in claim 3 wherein said lubricant introducing means include ports located within said end members.

5. A vehicle stabilizer as in claim 3 wherein said resilient means include:
    a first helical spring positioned between a first one of said end members and said first weight;
    a second helical spring positioned between said first weight and said second weight; and
    a third helical spring positioned between said second weight and a second one of said end members.

6. A vehicle stabilizer as in claim 5 wherein the interior angle at the apex of said inverted V-shaped tubular member is substantially 160°.

* * * * *